US012783469B2

(12) United States Patent
Zion et al.

(10) Patent No.: US 12,783,469 B2
(45) Date of Patent: Nov. 3, 2026

(54) SYSTEMS AND METHODS FOR ADDING A LOCAL DATABASE TO A VIRTUAL AGENT

(71) Applicant: ServiceNow, Inc., Santa Clara, CA (US)

(72) Inventors: Nisan Bar Zion, San Diego, CA (US); Xiao Zhang, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 19/051,870

(22) Filed: Feb. 12, 2025

(65) Prior Publication Data

US 2026/0236438 A1 Aug. 13, 2026

(51) Int. Cl.
*G06F 16/21* (2019.01)
*G06F 9/54* (2006.01)

(52) U.S. Cl.
CPC ................ *G06F 16/21* (2019.01); *G06F 9/54* (2013.01)

(58) Field of Classification Search
CPC .................................. G06F 16/21; G06F 9/54
See application file for complete search history.

(56) References Cited

U.S. PATENT DOCUMENTS

| | | | | |
|---|---|---|---|---|
| 6,789,085 | B2 | 9/2004 | Sturms et al. | |
| 8,615,635 | B2 | 12/2013 | Rakic | |
| 2009/0077006 | A1 | 3/2009 | Schmid | |
| 2022/0083566 | A1* | 3/2022 | Ben Ze'Ev | G06F 16/2282 |
| 2023/0214146 | A1* | 7/2023 | Singh | G06F 3/064 711/154 |
| 2024/0070146 | A1* | 2/2024 | Khalyknazarov | G06F 16/2386 |
| 2025/0173555 | A1* | 5/2025 | Luus | G06F 21/602 |

FOREIGN PATENT DOCUMENTS

| | | | |
|---|---|---|---|
| CN | 115878607 | A | 3/2023 |
| TW | 201229803 | A | 7/2012 |
| TW | 110122165 | A | 6/2021 |

* cited by examiner

*Primary Examiner* — Cindy Nguyen
(74) *Attorney, Agent, or Firm* — FLETCHER YODER PC

(57) ABSTRACT

A method includes providing, from a client instance to a client device, a specification defining local database usage by a virtual agent running on the client device. The method also includes receiving, from the client device, via an application programming interface (API), data retrieved from the local database. The local database is maintained by the client device in accordance with the specification. The method includes receiving, from the client device, a request to run a command on the database. The method includes running the command on the database to generate a result. Additionally, the method includes transmitting the result to the client device.

20 Claims, 6 Drawing Sheets

SYSTEMS AND METHODS FOR ADDING A LOCAL DATABASE TO A VIRTUAL AGENT

TECHNICAL FIELD

The present disclosure relates generally to managing a local database for a stateful virtual agent.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Endpoint devices (e.g., laptops, desktops, servers) may utilize a virtual agent that runs on the endpoint device and communicates with a cloud-based instance. The virtual agent may run commands periodically (e.g., every minute, every 10 minutes, etc.) and send the output of the commands to the instance for analysis. The analysis provides insights as to how the agent is running on the endpoint device, such as Central Processing Unit (CPU) utilization, memory utilization, and so forth. Virtual agents are typically stateless (e.g., the agent does not preserve data between running commands) and utilize a network connection to transfer the command outputs to the instance. Accordingly, if there is no network connection, the virtual agent may lose the command outputs instead of sending the outputs to the instance. As such, these virtual agents are "stateless" in that data associated with the agents is commonly lost between command executions. Over time, the endpoint device may experience resource creep as the virtual agent utilizes more and more resources of the endpoint device. For example, running multiple commands to access the database via the virtual agent may impact the CPU's memory and drastically decrease the processing speed of the CPU. In such cases, the CPU may experience performance degradation, which may impact operation of the endpoint device, the virtual agent, and/or the databases. Accordingly, new techniques are needed for providing local database access to a virtual agent so the data associated with a virtual agent may persist across command executions, while limiting excessive resource utilization of the endpoint device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method includes providing, from a client instance to a client device, a specification (e.g., parameter) defining local database usage by a virtual agent running on the client device. The method also includes receiving, from the client device, via an application programming interface (API), data retrieved from the local database. The local database is maintained by the client device in accordance with the specification (e.g., parameter). The method includes receiving, from the client device, a request to run a command on the database. The method includes running the command on the database to generate a result. Additionally, the method includes transmitting the result to the client device.

In another embodiment, a system including processing circuitry a memory, accessible by the processing circuitry. The system also includes storing instructions that, when executed by the processing circuitry, cause the processing circuitry to execute a client instance. The client instance is configured to perform operations including providing, from a client instance to a client device, a specification (e.g., parameter) defining local database usage by a virtual agent running on the client device. The client instance is also configured to perform receiving, from the client device, via an application programming interface (API), data retrieved from the local database. The local database is maintained by the client device in accordance with the specification (e.g., parameter). The client instance is also configured to perform receiving, from the client device, a request to run a command on the database. Further, the client instance is also configured to perform running the command on the database to generate a result. The client instance is also configured to perform transmitting the result to the client device.

In a further embodiment, a non-transitory, computer readable medium including instructions that, when executed by processing circuitry, cause the processing circuitry to perform operations including providing, from a client instance to a client device, a specification (e.g., parameter) defining local database usage by a virtual agent running on the client device. The processing circuitry performs operations including receiving, from the client device, via an application programming interface (API), data retrieved from the local database. The local database is maintained by the client device in accordance with the specification (e.g., parameter). The processing circuitry performs operations including receiving, from the client device, a request to run a command on the database. Additionally, the processing circuitry performs operations including running the command on the database to generate a result. The processing circuitry performs operations including transmitting the result to the client device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
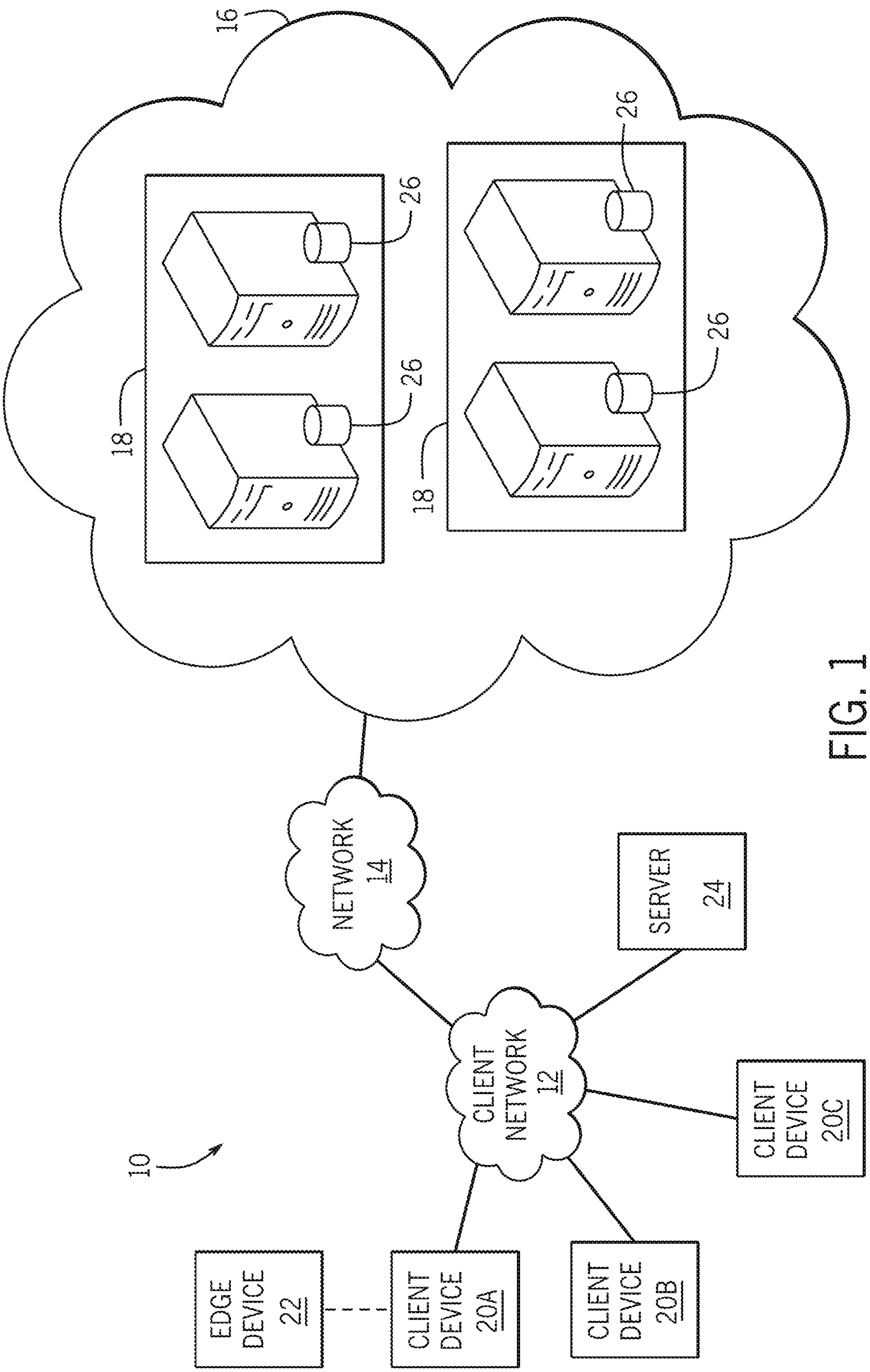
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function(s) described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

In addition, as used herein, the terms "real time"," real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed automatically in substantially real time during operation of the computing system and/or equipment controlled by the computing system, it will be appreciated that these operations may, in fact, be performed automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Endpoint devices (e.g., laptops, desktops, servers) may utilize a virtual agent that runs on the endpoint device and communicates with a cloud-based instance. The virtual agent may run commands periodically (e.g., every minute, every 10 minutes, etc.) and send the output of the commands to the instance for analysis. The instance may analyze how the agent is running on the endpoint device, such as Central Processing Unit (CPU) utilization, memory utilization, and so forth. Virtual agents are typically stateless (e.g., the agent does not preserve data between running commands). As such, virtual agents utilize a network connection to transfer the command outputs to the instance. Without such a network connection, the virtual agent may lose the command outputs instead of sending the outputs to the instance. Over time, the endpoint device may experience resource creep as the virtual agent utilizes more and more resources of the endpoint device. For example, running multiple commands to access the database via the virtual agent may impact the CPU's memory and drastically decrease the processing speed of the CPU. When this happens, the CPU may experience performance degradation, which may impact operation of the endpoint device, the virtual agent, and/or the databases. Accordingly, new techniques are needed for providing local database access to a virtual agent without utilizing excessive resources of the endpoint device.

Various embodiments disclosed herein are directed to adding a local database to a stateful virtual agent and allowing the batching of data records. Some commands the virtual agent executes may be aggregated over time. A stateful virtual agent may "remember" the data collected during a command run by keeping at least some (e.g., maximum, minimum, average) of the command run data stored in a local database until connection is restored and the virtual agent may send the command run data to the instance for analysis. Further, to protect the local database and corresponding CPU from overloading the available memory or cache, the virtual agent may specify requested database and table information, as well as information about the oldest record the database should keep, and the maximum number of records the database should keep. Every time the table receives a new data entry, the virtual agent may scan the table to ensure it complies with the predetermined record parameters. The virtual agent may truncate any data outside the predetermined record parameters to ensure the table is in compliance. For example, the virtual agent may use batching to ensure compliance with the predetermined parameters. Instead of processing 1 million records at a time, the virtual agent may process a smaller number of records (e.g., 10,000 records) until the virtual agent locates a specific record. Additionally, if an error is affecting some or all of the CPU system, the virtual agent may mark certain databases as databases to exclude from running processing commands until the error is resolved. Technical effects of the disclosed techniques include more efficient utilization of resources and computing power by reducing the amount of data the CPU system has to store and retrieve. Further, the virtual agent has local database access and can thus be "stateful" without occupying excessive resources of the endpoint device and negatively impacting the performance of the endpoint device.

With the preceding in mind, the following figures relate to various types of generalized system architectures or configurations that may be employed to provide services to an organization for which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20A, 20B, 20C may be computing systems and/or other types of computing devices that access cloud computing services, for example, via a web browser application or via an edge device 22 that may act as a gateway between the client devices 20A, 20B, 20C and the platform 16. FIG. 1 also illustrates that the client network 12 includes an administration or managerial application, device, agent, or server, such as a server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, to transfer data between the client devices 20A, 20B, 20C and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20A, 20B, 20C via the client network 12 and network 14. The network hosting the platform 16 provides additional computing resources to the client devices 20A, 20B, 20C and/or the client network 12. For example, by utilizing the network hosting the platform 16, users of the client devices 20A, 20B, 20C are able to build and execute applications and/or workflows for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to, a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
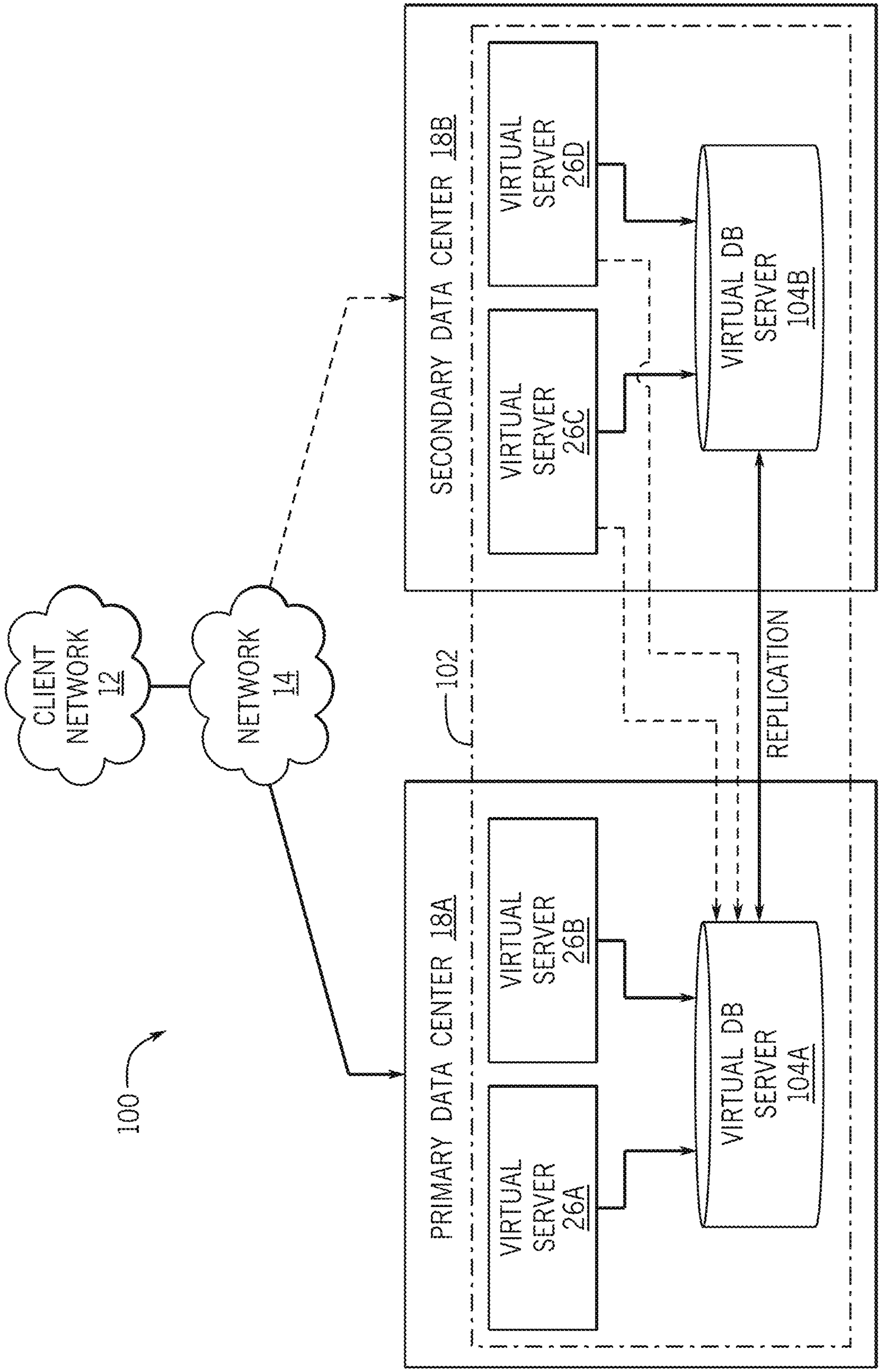
FIG. 2 is a schematic of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, this disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, edge devices, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
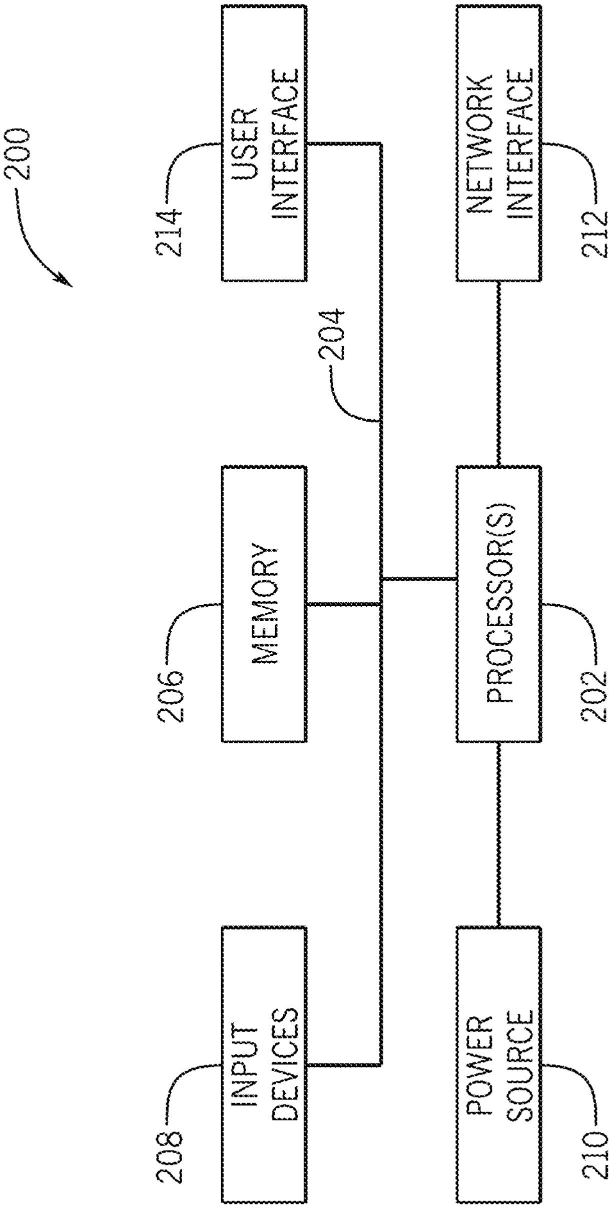
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computing system 200 may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202 (e.g., processing circuitry), one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
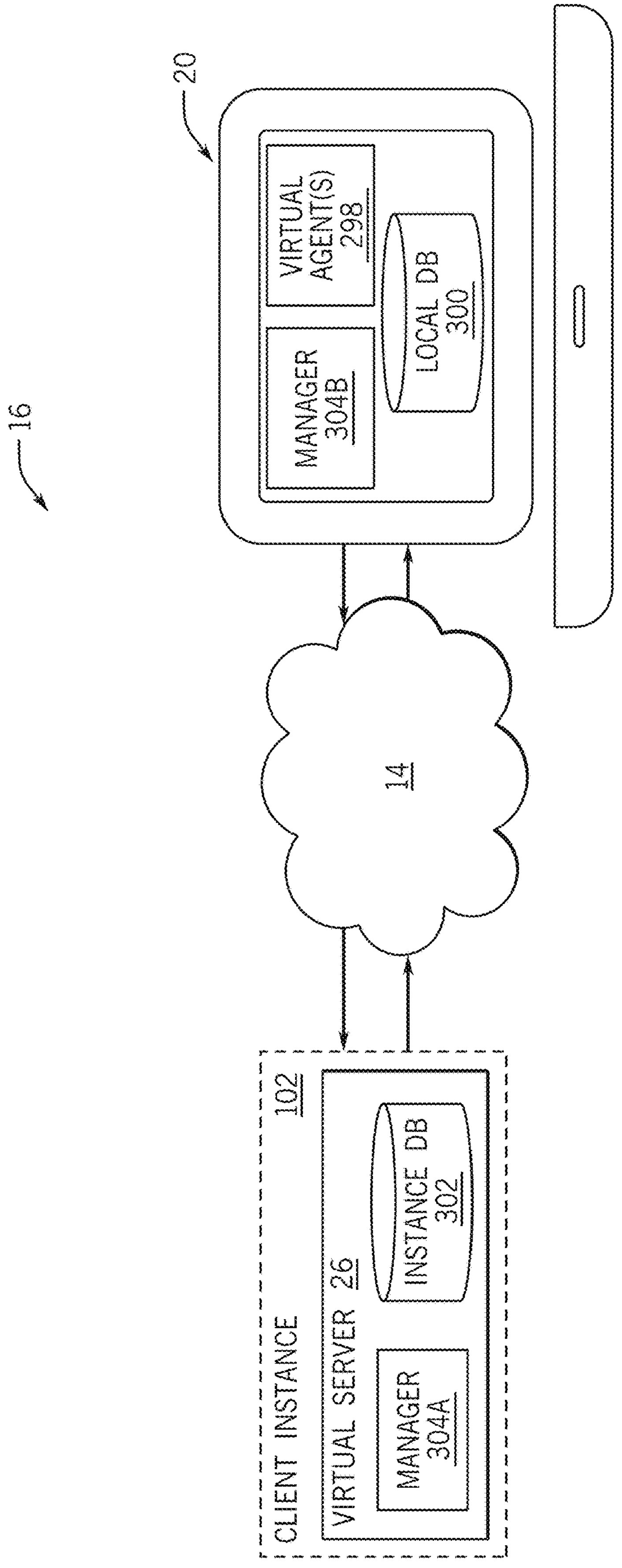
FIG. 4 is a block diagram illustrating a virtual server that supports and enables a client instance, in accordance with aspects of the present disclosure.

With the preceding in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser or a native application running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with the client instance 102 using an application and/or a web browser.

The client device 20 may host one or more virtual agents 298 and a local database 300, which may be utilized by the virtual agent 298. The local database 300 may store records of data generated and/or collected during a command run (e.g., when a command is executed by the virtual agent 298). The records of data may be stored in one or more tables on the local database 300. In order to prevent the virtual agent's 298 use of the local database 300 from over-extending the resources of the client device 20, the virtual agent's 298 use of the local database 300 may be managed by a database manager 304, which may be hosted by the client device 20, by the client instance 102, on an external device, or some combination thereof. The database manager 304 may include an instantiation 304B that runs on the client device 20 and an instantiation 304A that runs on the client instance 102. The instantiation 304B that runs the client device 20 and the instantiation 302A that runs the client instance 102 may work together via an API to manage the local database on the client device 20. For example, the database manager 304 may use its instantiations and the connecting API to instruct the virtual agent 298 to keep desired records in the local database 300, while removing old or excess records to limit the burden on the client instance and client device's 20 processing power. Accordingly, logic may be run by the client device 20 to determine available options for specifications (e.g., parameters) by which the database manager 304 may instruct the virtual agent to maintain, dispose of, or display records on the client device 20.

The client instance 102 may store an instance database 302, which may share records (e.g., some or all records) with the local database 300. The instance instantiation of the database manager 304A may perform operations (e.g., running scripts, performing maintenance) on the instance database 302. Specifically, as is described in more detail below, when the virtual agent 298 receives a request to retrieve and maintain or remove data records associated with a command, the instantiation of the database manager 304B located on the client device 20 may instruct the virtual agent 298 to transmit the records from the local database 300 to the client instance 102. The client instance 102 may then store the received records into the instance database 302 and the instance database manager 304A may perform operations to meet the request. The records available after the instance database manager 304A performs the operations may then be transmitted back to the local database 300 by the virtual agent 298. The database manager 304 may monitor the virtual agent's 298 use of the local database 300 and instance database 302 to verify the virtual agent's 298 use of these databases meets the parameters assigned by the user. The instance database manager 304A may batch and/or filter data based on predetermined parameters. Either the client instance instantiation 304A or the client device instantiation 304B of the database manager 304 may remove or maintain batched data records from the local database 300 based on the predetermined specifications (e.g., parameters) provided to the virtual agent 298 by the user. If the database manager 304 maintains the data records, the virtual agent 298 may return the data records to the local database 300 on the client device 20. The database manager 304 may run or re-run the operations on any records to identify one or more specifications (e.g., parameters) that had previously aligned with the batched data records, but are no longer compatible with the updated specifications (e.g., parameters) and provide an output to the client device 20 of newly batched and filtered data records based on the updated specifications (e.g., parameters). As additional data records are received, the instance database manager 304A may re-run the operations on the records by receiving records to the instance database 302 sent by the virtual agent 298, performing the operations, and providing the remaining records for the virtual agent 298 to return to the local database 300 on the client device 20.

In operation, the client device 20 and the client instance 102 may communicate via an application programming interface (API). In some embodiments, the client device 20 and the client instance 102 may communicate indirectly through an intermediary such as an MID server. Within the client device 20, the local database 300 may be subject to various local database parameters and guidelines. These parameters may include a maximum number of records, a maximum record age, an exclusion list, and the like. In some embodiments, the parameters may be a default number configurable via a user input. As such, the user may adjust the parameters from the default value to a number suited to meet the user's processing targets. A maximum number of records may be the largest amount of records the local database 300 may hold in its tables at one time. The default number for the maximum number of records may be 1,000, 000 records, but may be adjustable as the user desires. A maximum record age may be the longest amount of time or the oldest age that a record may be stored in the tables of the local database 300. The default number for the maximum record age may be 365 days. However, the user may adjust the maximum number age based on the user's target operating parameters, such as if the user has a small amount of file disk space on the client device 20. An exclusion list may be a database or more than one database the virtual agent 298 is prohibited from using. A database may be excluded because it is being used for a different command when the virtual agent 298 is transmitting the databases, because the database(s) are predetermined and do not change with new commands, because the database is compromised, and the like. A database on the exclusion list may be excluded from truncation, may be excluded from commands, or both.

In order to register a table in the local database 300, the virtual agent 298 provides a request to the database manager 304. The database manager 304 may then identify the oldest age of the records to keep and the maximum number of records to keep. Thus, in this example implementation, the age and number of records are the parameters the database manager 304 uses to manage the virtual agent's 298 use of the local database 300. The database manager 304 may manage the parameters and truncate the records of the local database 300. When the virtual agent 298 locally truncates the records on the client device 20, the virtual agent 298 may batch (e.g., send the records in smaller segments) the records to limit CPU usage during the truncation process. In some embodiments, batching may occur after a query is completed. The batch size may depend on the size of the datasets, and larger datasets may require larger or more batches.

When a database is problematic, in use, or compromised, the database manager 304 may exclude (e.g., based on a user input) the database from the truncation process by placing the database on an exclusion list. If the bug or problem in the database is resolved, the database may be removed from the exclusion list and guided through the truncation process by the virtual agent 298 and the database manager 304. Adding a problematic database to the exclusion list may protect the client instance 102, client device 20, or both from propagating a problem (e.g., malware or data inconsistency) present in the local database 300.

Figure 5:
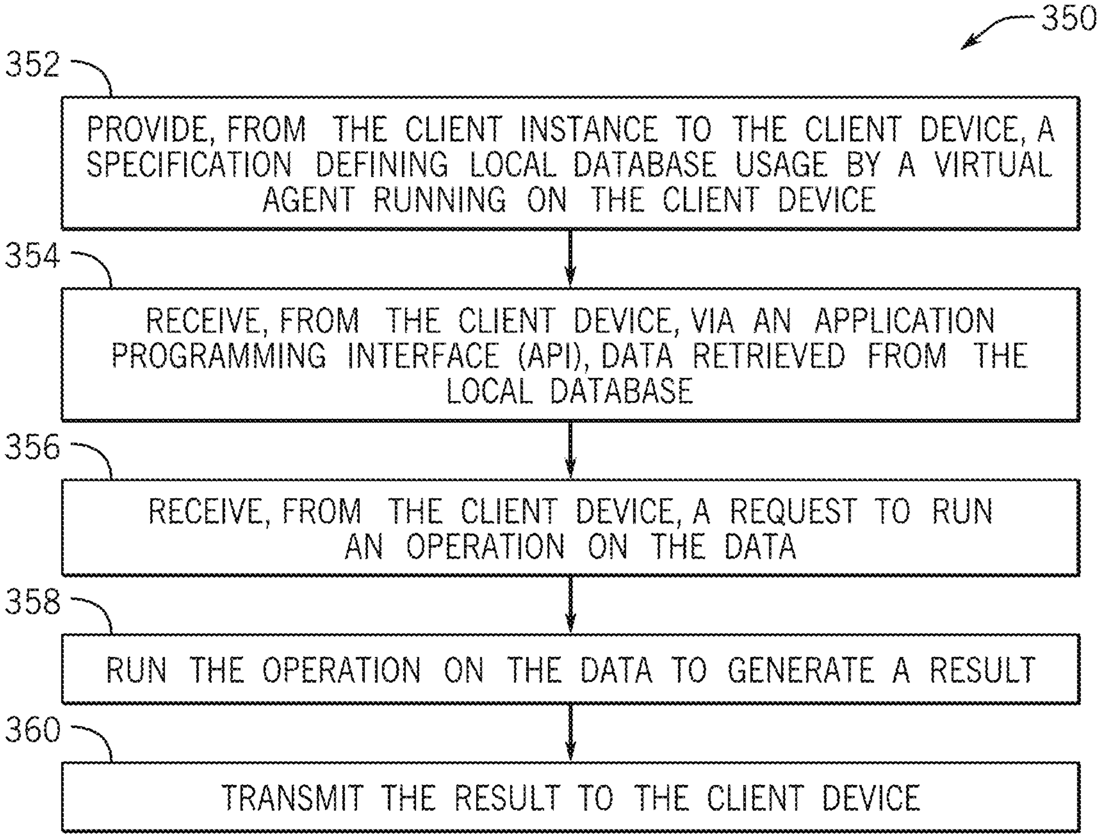
FIG. 5 is a flowchart of a process for managing local database usage by a virtual agent running on a client device, from the perspective of the client instance of FIG. 4, in accordance with aspects of the present disclosure.
Figure 6:
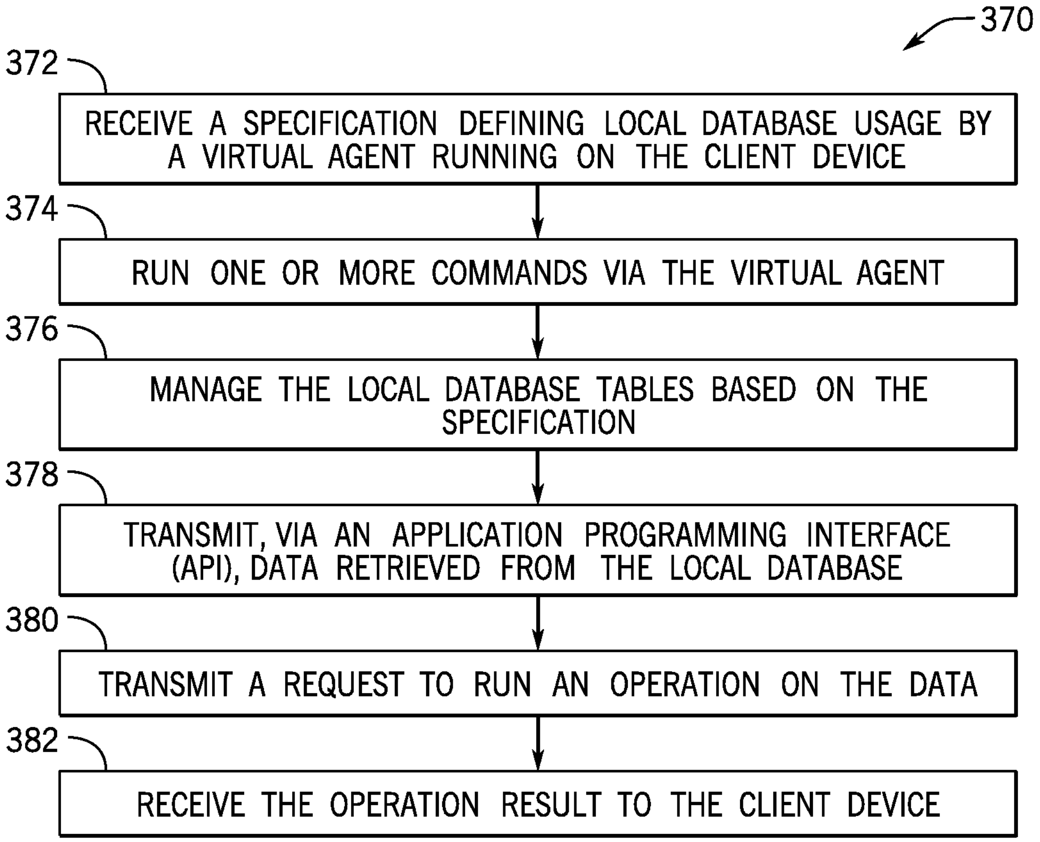
FIG. 6 is a flowchart of a process for managing the local database usage by the virtual agent, from a client device perspective, in accordance with aspects of the present disclosure.

FIG. 5 and FIG. 6 illustrate processes for managing local database usage by a virtual agent. FIG. 5 illustrates the process 350 of managing local database usage from the perspective of the client instance, while FIG. 6 illustrates the process 370 of managing local database usage from the perspective of the client device.

At block 352, the client instance 102 provides a specification defining local database 300 usage by a virtual agent running on the client device 20. From the client device's 20 perspective, at block 372, the client device 20 receives a specification from the client instance 102 defining local database 300 usage by a virtual agent running on the client device 20. In some embodiments, the virtual agent may create the local database 300 and its tables, as well as insert records, update records, handle record queries, delete records, or the like. In other embodiments, the virtual agent may run a command (e.g., a check) that may create one or more local databases and corresponding tables, as well as insert records, update records, handle record queries, delete records, or the like.

From there, at block 374, the client device 20 may use the virtual agent 298 to run one or more commands as part of the client device's standard operation. The commands may include a command to create a table for the records, force a clean-up or purge of a record table, determine if a record table exists, add columns to or remove columns from the record table, create a record index based on the records in a table, delete a record from a table, update one or more columns of a table, batching operations in a file, and the like. The virtual agent may run a command upon a request from a user (e.g., an input, enabling or disabling notifications, requesting help, etc.) or upon standard maintenance of the system or background operations performed by the virtual agent 298. When a user interacts with the client device or the virtual agent performs a command in a way that generates new records for the database, the virtual agent 298 may deposit the new records into the database. The commands may generate data, which the virtual agent 298 may deposit into the local database 300.

In some embodiments, the virtual agent may run the command periodically. The virtual agent may run the command once a minute, once every 10 minutes, once an hour, or at any other time interval as the virtual agent 298 performs maintenance or background operations. At the time provided, client device 20 may request the virtual agent 298 run the command on the records.

In some embodiments, the command may run once a day. The virtual agent may have a scheduled time at which the command operates, truncating the data records in the table based on the specification (e.g., parameter) provided to the client device 20 in block 352. This time may be a specific time (e.g., 10 am, 11 am, 5 pm, etc.) or a time range (e.g., 10-11 am, 1-2 pm, etc.). At the time provided, client device 20 may request to run the command on the database.

In other embodiments, the command may run once the client device 20 turns on. The virtual agent may run the command every time the client device 20 powers up and/or boots up. This may occur multiple times a day, once a day, once every few weeks, or the like. For example, if the user reboots the client device 20, the virtual agent may run the command, even if the client device 20 ran the command earlier that day. As such, the specification may include instructions for the virtual agent to access the local database upon starting or restarting.

In other embodiments, the command may be run upon request from the user. The user may manually request the virtual agent run the command by providing the request to the client device 20 to initiate the request via the virtual agent. In some embodiments, the user's manual requests for the virtual agent to run the command may be the only times the virtual agent runs the commands When the user's client device 20 slows down, the user may then request the virtual agent run the command, which may increase the speed of the client device 20 by reducing the number of records in the database, which may free up resources for the client device 20 to use in other computing tasks. In some embodiments, the command may be run automatically from the client instance 102 upon an interaction with the local database 300.

In some embodiments, if running commands on particular tables and/or databases has previously caused a spike in CPU utilization, the virtual agent may mark or block off the tables and/or the databases, or otherwise avoid running the command until the issue has been resolved. The virtual agent may send an alert or notification to the user via a display on the graphical user interface (GUI), informing the user of the error preventing processing. In some embodiments, the display may provide information about how to identify and/or resolve the error. Once the error is resolved, the virtual agent may run the command. In some embodiments, the virtual agent may run the command at the next scheduled time. In other embodiments, the virtual agent may run the command immediately following the error resolution and the virtual agent may adjust the command schedule accordingly. For example, if the command is scheduled to run every 10 minutes, and was originally scheduled to run at 9:10 am, but ran at 9:13 am due to an error, the next scheduled run time may be 9:23 am, instead of 9:20 am.

In other embodiments, if an error is affecting part of the CPU system, the virtual agent may mark or block off the tables and/or the databases involved in the errors to avoid running the command on those tables until the error is resolved. The virtual agent may send an alert or notification to the user via a display on the graphical user interface (GUI), informing the user of the error preventing processing. In some embodiments, the display may provide information about how to identify and/or resolve the error. Once the error is resolved, the virtual agent may run the command on the tables initially blocked off due to error. In some embodiments, the virtual agent may run the command at the next scheduled time. In other embodiments, the virtual agent may run the command immediately following the error resolution and the virtual agent may adjust the command schedule accordingly. For example, if the command is scheduled to run every 10 minutes, and was originally scheduled to run at 11:20 am, but ran at 11:25 am due to an error, the next scheduled run time may be 11:35 am, instead of 11:30 am. Further, in some embodiments, the system may run all the tables in the database during the next command run, or the system may run only the affected tables when the error is cleared and run the unaffected tables during the normal schedule.

The client device 20 then manages the local database tables based on the specification at block 376. To accomplish this, the client device 20 may utilize the local database manager 304B at the instruction of the virtual agent 298.

The specification may define a limit to the amount of records kept in the local database 300. The oldest record may be determined based on the last modified date or the date of generation of the record. In some embodiments, the specification may be a maximum number of records. For example, the specification may limit the local database to a maximum number of records (e.g., 100 records, 500 records, 1,000 records, 5,000 record, 10,000 records, 100,000 records, or any other number of records). Once the number of records in the local database reaches or exceeds the maximum number of records, the database manager may remove any records over maximum number of records (e.g., by removing oldest records first), or any number of records such that the number of records in the local database is less than the maximum number of records. For example, when a new record is added to the database, the process 370 may make an assessment as to the number of records in the local database and whether the number of records exceeds the maximum. If so, the process 370 may remove a number of records from the database that corresponds to the number of records in the database that exceeds the maximum number of records. Which records are removed may be determined based on the user's preferences or by applying one or more rules/guidelines. For example, the local database manager 304 may be configured to truncate the local records and remove the oldest records until the number of records in the local database 300 is less than the maximum number of entries.

In some embodiments, the specification may define a minimum number of records. A minimum number of records may be beneficial to achieving a certain level of accuracy to complete certain commands. The minimum number of records may be greater than or equal to 20, 50, 75, 100, 200, 300, or any other number of records, and may depend on the target operation for the CPU system, as some CPU systems may benefit from maintaining more records, while other CPU systems may not utilize many records for efficiency. For example, a client instance 102 analyzing computer operating efficiency over a week-long period of time may maintain more records than a client instance 102 analyzing the operating efficiency of one aspect the CPU system. When the process 370 truncates the records in the table in the local database, it may truncate only to the minimum number of records. For example, if the specifications (e.g., parameters) have a minimum number of records of 50 records, the process 370 may truncate the number of records to keep to no less than the minimum number of records.

In yet other embodiments, the specification may define an average number of records. The average number of records may be based on the average or median number of records stored in other tables in the database, or in other similar databases. In some embodiments, the average number of records may be a single average number of records, such as 100, 101, 102, or the like. In this case, if the number of records in a table is below the average number of records, the process 370 may not truncate the records in the table until the number of records reaches or exceeds the average number of records. Once the number of records exceeds the average number of records, the process 370 may truncate the records in the table to, or below, the average number of records. Further, in response to the lower than average or higher than average number of records, the process 370 may adjust the new average number of records. However, in some embodiments, if the number of records is over a certain percentage greater or lower than the average number of records, the process 370 may consider the number of records an outlier and not adjust the average number of records. For example, if the average number of records is 50, and the number of records at one time is 75, the process 370 may truncate the number of records down to 50, but not adjust the average number of records because the number of records was 50% greater than the average number of records and is likely an outlier.

In other embodiments, the average number of records may be a range of a number of records. For example, the range may be between 60 and 80 records, between 100 and 150 records, between 200 and 205 records, and the like. In this case, if the number of records in a table is outside the average record range, the process 370 may truncate the records in the table to be within the range of the average number of records. Further, in response to the lower than average or higher than average number of records, the process 370 may adjust the new average number of records. However, in some embodiments, if the number of records is over a certain percentage greater or lower than the thresholds of the range of the average number of records, the process 370 may consider the number of records an outlier and not adjust the average number of records. For example, if the average number of records is between 30 and 50, and the number of records at one time is 75, the process 370 may truncate the number of records down to 50, but not adjust the average number of records because the number of records was 50% greater than the upper threshold of the average number of records and is likely an outlier.

In still other embodiments, the specification may define an oldest record age. The oldest record age may be the age of the oldest record kept in the table. The oldest record may be evaluated based on a target oldest record age. For example, the specification (e.g., parameter) may indicate the process 370 may truncate the records in the table that are older than the oldest record age (e.g., 1 month, 3 months, 4 months, 6 months, 8 months, 12 months, etc.). Accordingly, when a new record is received, the process 370 may determine whether any of the records in the local database are older than the oldest record age. Any records newer than the oldest record age may be maintained in the tables of the local database, while any records older than the oldest record age may be removed from the tables.

The oldest record age may also be based on the dates of the existing records in the tables. Instead of truncating records based on a specific oldest records age, the process 370 may truncate a number of records in the table that are the oldest, regardless of the date of the record. If multiple records are from the same date, the process 370 may truncate all the records from that date, or the process 370 may truncate the oldest record based on the timestamp of the record. For example, if there are two records from the same day, but one of the records is from 8 am, and the other record is from 9 am, the process 370 may truncate the record from 8 am, but maintain the record from 9 am.

At block 378, the client device 20 may transmit, via an application programming interface (API), data retrieved from the local database 300. The data may include both the specification and data from one or more of the records contained in the tables of the local database 300. The client instance 102 may, at block 354, receive from the client device 20, via the API, data retrieved from the local database 300. The data retrieved from the local database may relate to how the virtual agent 298 is running on the client device. In some embodiments, the data may include CPU utilization data, memory utilization data, or the like. The client device 20 may transmit the data from the local database 300 to the client instance 102. The client instance 102 may then store the data from the local database 300 into the instance database 302.

In some embodiments, the virtual agent may batch the records the virtual agent 298 transmits to the client instance 102 for truncation. The batches may be determined by table, by number of records, by type of record, or the like. Batching the records may reduce the computing resources needed for the virtual agent to transmit the records, or the instance data manager 304A to truncate the records, which may reduce impact of the computing speed and make the truncation and transmission process more energy efficient. The virtual agent 298 may separate the records or tables into batches and transmit the batches for the database manager 304 to truncate one batch at a time. For example, the virtual agent 298 may transmit 20 batches of 100 records, instead of transmitting one batch of 2,000 records.

In other embodiments, the virtual agent may transmit all the tables and records for the instance database manager 304A to truncate at one time. This may be advantageous when the local database has a relatively small number of records. Because the local database has a relatively small number of records, the transmission and truncation may be performed on all the records at one time without noticeably affecting the computing speed or losing efficiency.

If the virtual agent is unable to transmit the data to the client instance 102, the virtual agent may postpone transmitting the data until the next scheduled time, until the user manually requests the virtual agent run the command, or until the next time the virtual agent is capable of transmitting the data. As such, the client device 20 may store the records until a connection to the client instance 102 is reestablished. A lack of transmission capability by the virtual agent may indicate a lack of connection of the client device 20 to the client instance 102 or another underlying issue that prevents a connection between the client device 20 and client instance 102.

Next, at block 380, the client device 20 may transmit a request to run an operation on the data. From the client instance 102 perspective, the client instance 102 may, at block 356, receive, from the client device 20, a request to run an operation on the data. Once the client instance has received the request to run a data processing operation on the data from the client device 20 at block 356, the client instance 102 may run the data processing operation on the data to generate a result at block 358.

When the client instance 102 generates the result, the client instance 102 may then transmit the result to the client device 20 at block 360, which the client device 20 may receive at block 378. The user may then utilize the up-to-date results. Once the client device 20 receives the results from the client instance 102, the client device 20 may use the results in its operation. Utilizing the results in its operation may include updating the virtual agent's 298 behavior or knowledge or updating the specification based on the newly truncated records on the local database for future commands.

Though FIGS. 5 and 6 illustrate a specific embodiment of managing local database usage by one or more virtual agents, it should be understood that this is merely an example provided for illustrative purposes and that it should be understood that embodiments are envisaged having different combinations of database and/or storage specifications. Accordingly, embodiments are envisaged in which the disclosed techniques can be applied to many different combinations of specifications for records for a wide range of local databases. As such, the embodiments shown in FIGS. 5 and 6 are not intended to limit the scope of the claims.

The presently disclosed techniques are directed to adding a local database to a stateful virtual agent and allowing the batching of data records. Some commands the virtual agent executes may be aggregated over time. A stateful virtual agent may "remember" the data collected during a command run by keeping at least some (e.g., maximum, minimum, average) of the command run data stored in a local database until connection is restored and the virtual agent may send the command run data to the instance for analysis. Further, to protect the local database and corresponding CPU from overloading the CPU memory, the virtual agent may specify requested database and table information, as well as information about the oldest record the database should keep, and the maximum number of records the database should keep. Every time the table receives a new data entry, the virtual agent may analyze the table to ensure it complies with the predetermined record parameters. The virtual agent may truncate any data outside the predetermined record parameters to ensure the table is in compliance. For example, the virtual agent may use batching to ensure compliance with the predetermined parameters. Instead of processing 1 million records at a time, the virtual agent may process a smaller number of records (e.g., 10,000 records) until the virtual agent locates a specific record. Additionally, if an error is affecting some or all of the CPU system, the virtual agent may mark certain databases as databases to exclude from running processing commands until the error is resolved.

Technical effects of the disclosed techniques include more efficient utilization of resources and computing power by reducing the amount of data a processor or processor-based system has to store and retrieve. Further, the virtual agent has local database access and can thus be "stateful" without occupying excessive resources of the endpoint device and negatively impacting the performance of the endpoint device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as “means for [perform]ing [a function] . . . ” or “step for [perform]ing [a function] . . . ”, it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:

providing, from a client instance to a client device, a specification defining local database usage by a virtual agent running on the client device, wherein the specification comprises instructions for the client device to delete records in a plurality of batches when the local database contains more records than a threshold number of records, wherein the plurality of batches comprises a number of records that is smaller than a total number of records to be deleted;

receiving, from the client device, via an application programming interface (API), data retrieved from the local database, wherein the local database is maintained by the client device in accordance with the specification;

receiving, from the client device, a request to run a command on the local database;

running the command on the local database to generate a result; and transmitting the result to the client device.

2. The method of claim 1, wherein the specification defines a maximum number of records in the local database.

3. The method of claim 2, wherein the maximum number of records in the local database comprises 1000 records.

4. The method of claim 2, wherein the specification comprises instructions for the client device to delete records from the local database when the maximum number of entries is reached.

5. The method of claim 4, wherein the specification comprises the instructions for the client device to delete the records from the local database based on record age when the maximum number of entries is reached.

6. The method of claim 1, wherein the specification defines a record age threshold for the local database.

7. The method of claim 6, wherein the specification comprises instructions for the client device to delete records from the local database that have a record age that exceeds the record age threshold.

8. The method of claim 1, wherein the specification comprises instructions for the client device to retrieve records from the local database in an additional plurality of batches, wherein each batch of the plurality of batches comprises an additional number of records that is smaller than a total number of records requested.

9. The method of claim 1, wherein the specification comprises an exclusion list, wherein the exclusion list identifies one or more databases that the virtual agent is prohibited from using.

10. The method of claim 1, comprising:

identifying a lack of transmission capacity between the client device and the client instance;

storing the specification on the client device;

receiving a request to transmit the stored specification to the client instance; and verifying the transmission capacity is restored.

11. The method of claim 1, wherein the specification comprises instructions for the virtual agent to access the local database upon starting or restarting.

12. A system, comprising:

processing circuitry; and a memory, accessible by the processing circuitry, and storing instructions that, when executed by the processing circuitry, cause the processing circuitry to execute a client instance, wherein the client instance is configured to perform operations comprising:

providing, from a client instance to a client device, a specification defining local database usage by a virtual agent running on the client device, wherein the specification comprises instructions for the client device to delete records in a plurality of batches when the local database contains more records than a threshold number of records, wherein the plurality of batches comprises a number of records that is smaller than a total number of records to be deleted;

receiving, from the client device, via an application programming interface (API), data retrieved from the local database, wherein the local database is maintained by the client device in accordance with the specification;

receiving, from the client device, a request to run a command on the local database;

running the command on the local database to generate a result; and transmitting the result to the client device.

13. The system of claim 12, wherein the specification defines a record age threshold for the local database and wherein the specification comprises instructions for the client device to delete records from the local database that have a record age that exceeds the record age threshold.

14. The system of claim 12, wherein the specification comprises instructions for the client device to retrieve records from the local database in an additional plurality of batches, wherein each batch of the additional plurality of batches comprises an additional number of records that is smaller than a total number of records requested.

15. The system of claim 12, wherein the specification defines a maximum number of records in the local database, and wherein the specification comprises instructions for the client device to delete records from the local database when the maximum number of entries is reached.

16. A non-transitory, computer readable medium comprising instructions that, when executed by processing circuitry, cause the processing circuitry to perform operations comprising:

providing, from a client instance to a client device, a specification defining local database usage by a virtual agent running on the client device, wherein the specification comprises instructions for the client device to delete records in a plurality of batches when the local database contains more records than a threshold number of records, wherein the plurality of batches comprises a number of records that is smaller than a total number of records to be deleted;

receiving, from the client device, via an application programming interface (API), data retrieved from the local database, wherein the local database is maintained by the client device in accordance with the specification;

receiving, from the client device, a request to run a command on the local database;

running the command on the local database to generate a result; and transmitting the result to the client device.

17. The non-transitory, computer readable medium of claim 16, wherein the specification defines a record age threshold for the local database and wherein the specification comprises instructions for the client device to delete records from the local database that have a record age that exceeds the record age threshold.

18. The non-transitory, computer readable medium of claim 16, wherein the specification comprises instructions for the client device to retrieve records from the local database in an additional plurality of batches, wherein each batch of the additional plurality of batches comprises an additional number of records that is smaller than a total number of records requested.

19. The non-transitory, computer readable medium of claim 16, wherein the specification defines a maximum number of records in the local database, and wherein the specification comprises instructions for the client device to delete records from the local database when the maximum number of entries is reached.

20. The non-transitory, computer readable medium of claim 19, wherein the specification comprises the instructions for the client device to delete the records from the local database based on record age when the maximum number of entries is reached.

* * * * *